Dec. 2, 1924 1,517,724
J. P. GIULIANA
AUTOMOBILE BUFFER
Filed March 4, 1924
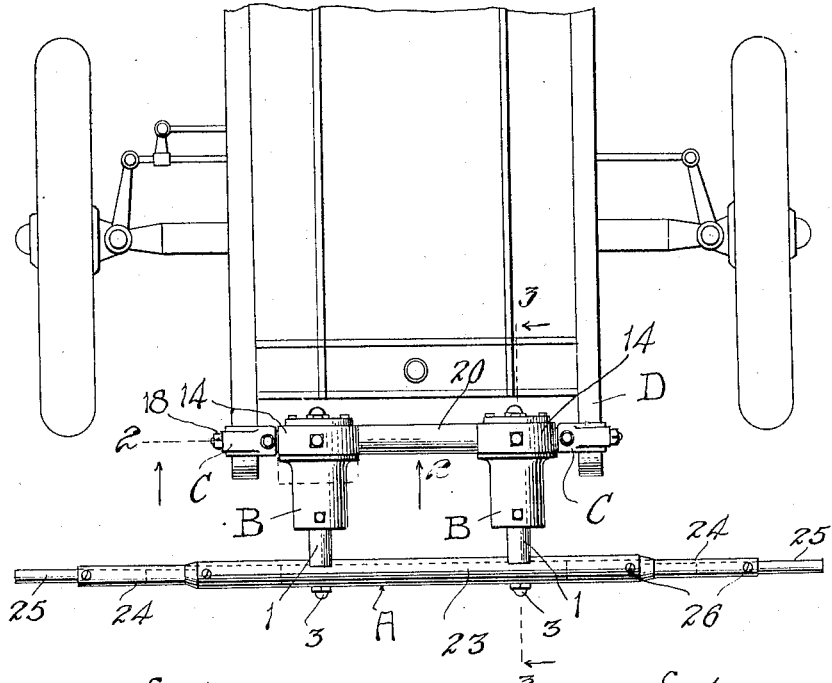
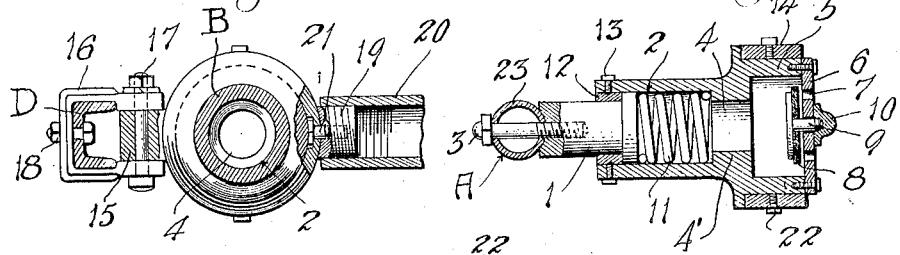
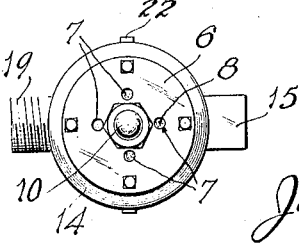
INVENTOR:
Joseph P. Giuliana
BY Everett + Cook,
ATTORNEYS.

Patented Dec. 2, 1924.

1,517,724

UNITED STATES PATENT OFFICE.

JOSEPH P. GIULIANA, OF NEWARK, NEW JERSEY.

AUTOMOBILE BUFFER.

Application filed March 4, 1924. Serial No. 696,750.

*To all whom it may concern:*

Be it known that I, JOSEPH P. GIULIANA, a citizen of the United States, and a resident of Newark, in the county of Essex and State of New Jersey, have invented new and useful Improvements in Automobile Buffers, of which the following is a specification.

This invention relates to automobile buffers, bumpers or fenders utilized to absorb the shocks incident to collisions, one object of the invention being to provide a buffer embodying novel and improved features of construction for combining the effects of springs and of compressed air to most effectually absorb shocks incident to collisions.

Another object is to provide such a construction wherein compressed air produced as a result of the force of the impact incident to a collision is utilized to reenforce or supplement the yielding resistance of a spring so that the greater the force of the impact the greater will be the cushioning or shock absorbing abilities of the construction.

A further object is to provide a buffer of the character described embodying a novel and improved construction wherein a spring under a constant compression is utilized to absorb light shocks, said spring being supplemented by compressed air the pressure of which is increased by the force of the impact of collision, thereby obtaining the superior cushioning effect of compressed air for heavy shocks and utilizing the spring as a cushion until the air is compressed sufficiently to effectively absorb the shocks. This advantage will be more readily understood when the difficulty and time necessary to raise the pressure of air from atmospheric pressure to a pressure appreciably higher, such as would be incident to a collision of an automobile with a stationary object, is considered.

Other objects are to provide a buffer of the character described embodying a novel combination of buffer bar to receive impacts of collision, a piston and a cylinder for compressing air between them upon movement of said buffer bar under an impact of collision, and a spring to yieldingly resist relative movement of said piston and cylinder under an impact of collision; to provide a simple and reliable construction which will not easily get out of repair, and to obtain other results and advantages as may be brought out by the following description.

Referring to the accompanying drawings in which corresponding and like parts are designated throughout the several views by the same reference characters, Figure 1 is a top plan view of an automobile buffer embodying the invention, showing the same mounted in operative position on the front of an automobile chassis;

Figure 2 is a transverse vertical sectional view taken on the line 2—2 of Figure 1;

Figure 3 is a longitudinal sectional view taken on the line 3—3 of Figure 1, and Figure 4 is a rear elevation of one of the shock absorber casings.

In the specific embodiment of the invention shown on the drawings, the reference character A designates a buffer bar adapted to extend transversely of the front or rear of an automobile chassis to receive the impacts incident to a collision, said buffer bar being carried by shock absorber casings B mounted in brackets C which are fixedly secured to the side bars D of the chassis of the automobile.

Substantially equi-distantly from opposite ends thereof, the buffer bar A is connected to pistons or plungers 1 slidably mounted in cylinders 2 formed in the shock absorber casings B. In the present instance, bolts or the like 3 are utilized to secure the buffer bar to the pistons 1, but obviously other equivalent means might be utilized. At its inner end each of the cylinders is formed with a reduced opening 4 communicating with an enlarged air chamber 5 the outer end of which is closed by a cover plate 6 having a plurality of valve ports 7 therein with which is adapted to cooperate a sliding valve disc 8. In the present instance, said valve disc is carried by a rod 9 slidable substantially coaxially of the cover plate 6 so as to be capable of reciprocating to open and close the ports 7. Movement of the valve disc inwardly of the chamber 5 is limited by a nut 10 on the outer end of the rod 9. A compression spring 11 is interposed between the inner end of the piston 1 and the inner end of the cylinder 2, the reduced opening 4 forming a seat 4' therefor and said spring being constantly under compression so as to tend to force the piston 1 outwardly of the cylinder. Such outward movement of the piston is limited by a bushing 12 secured in the outer end of the cylinder by means of set screws 13.

The shock absorber casings B are fitted into the respective bracket collars 14 which are provided with laterally projecting lugs 15 adapted to be secured to clamps 16 by means of bolts 17. The clamps 16 may be bolted or otherwise fixedly secured as at 18 to the respective side bars D of the chassis. Preferably, the bracket collars 14 are rigidly connected to reenforce the same against shocks incident to impacts of the buffer bar A with a fixed object. For this purpose, a threaded stud 19 may be secured to the outer side of each of the collars 14 adjacent the other thereof, said studs being connected by a tube 20. The studs 19 may be secured to the collars 14 by bolts 21.

In the operation of the buffer, when the buffer bar A collides with any object, for instance an automobile in the front or the rear of the automobile carrying the buffer bar, the pistons 1 are forced inwardly of the cylinders 2 against the influence of the springs 11, whereby said springs absorb a part at least of the shock incident to the collision. As the pistons 1 move inwardly of the cylinders 2 the air in the chambers 5 is compressed so as to close the valve disc 8 over the ports 7. The air thus cannot escape from the chambers 5, and under compression by the pistons 1 serves to absorb part of the shock of the collision. As soon as the pressure on the buffer bar A is relieved, the springs 11 and the compressed air in the chambers 5 will force the pistons 1 outwardly of their respective cylinders, and at the same time the valve disc 8 will be drawn inwardly by the suction created by such movement of the pistons 1, so as to admit air into the chambers 5. The springs 11 are of sufficient strength to absorb the lighter shocks and to initially absorb a portion of the heavier shocks until the air in the chambers 5 is sufficiently compressed to reenforce the spring in absorbing the heavier shocks. The construction thus enables the practical utilization of the cushioning effect of the compressed air by combining therewith the effect of compression springs. It will be noted that the air is compressed by the force of the impact of collision so that the greater the force of the impact, the greater will be the pressure of the air in the chambers 5. The desirable gradually increasing resistance to the impact of collision is thus obtained, which would not be possible were compressed air under a constant uniform pressure utilized behind the pistons 1, or without the springs 11.

With the particular mounting of the shock absorber casings on the chassis of the automobile, the said casings may be easily and quickly applied to an automobile chassis and easily and quickly removed for adjustment or repair of the parts thereof. For holding the shock absorbing casings within the collars 14, I may utilize screws or the like 22.

Preferably the buffer bar A is adjustable for different widths of automobiles, and to accomplish this result, the bar may be formed of a tubular main central section 23 within each end of which is telescopically arranged a tubular section 24 which telescopically receives a rod 25. The sections 24 and rods 25 are adjustable longitudinally by telescoping action and are held in adjusted positions by screws 26.

While I have shown and described the automobile buffer as embodying certain details of construction, it will be understood that this is mainly for the purpose of illustrating a now preferred embodiment of the invention and that many modifications and changes can be made in the details of construction without departing from the spirit and scope of the invention. Therefore, I do not desire to be understood as limiting myself except as required by the following claims when construed in the light of the prior art.

Having thus described the invention, what I claim is:

1. An automobile buffer comprising a buffer bar adapted to extend transversely of the chassis of an automobile to receive impacts of collisions, a shock absorber casing adapted to be fixedly connected to said chassis and formed with a cylinder and an air chamber communicating with one end thereof, a piston slidable in said cylinder and connected to said buffer bar to compress air in said chamber upon movement of said buffer bar under impacts of collision, a valve port for said chamber communicating with the atmosphere, and a valve adapted to automatically close said port upon movement of said piston in the direction to compress air in said chamber and to automatically open said port upon movement of said piston in the opposite direction.

2. An automobile buffer comprising a buffer bar adapted to extend transversely of the chassis of an automobile to receive impacts of collisions, a shock absorber casing adapted to be fixedly connected to said chassis and formed with a cylinder and an air chamber communicating with one end thereof, a piston slidable in said cylinder and connected to said buffer bar to compress air in said chamber upon movement of said buffer bar under impacts of collision, a valve port for said chamber communicating with the atmosphere, a valve adapted to automatically close said port upon movement of said piston in the direction to compress air in said chamber and to automatically open said port upon movement of said piston in the opposite direction, and a compression spring to yieldingly resist movement of said piston in said first-mentioned direction.

3. An automobile buffer comprising a buffer bar adapted to extend transversely of the chassis of an automobile to receive impacts of collisions, a shock absorber casing adapted to be fixedly connected to said chassis and formed with a cylinder at one end and an air chamber at the other end communicating with said cylinder and a spring seat between said cylinder and said air chamber, a piston slidable in said cylinder and connected to said buffer bar to compress air in said chamber upon movement of said buffer bar under impacts of collision, and a spring interposed normally under compression between said piston and said spring seat.

4. An automobile buffer comprising a buffer bar adapted to extend transversely of the chassis of an automobile to receive impacts of collisions, said buffer bar including a tubular main section and end sections longitudinally telescopically adjustable therein to accommodate said bar to automobiles of different widths, and a shock absorbing device connected to said buffer bar and adapted to be fixedly connected to said chassis to absorb shocks received by said buffer bar.

JOSEPH P. GIULIANA.